J. E. Karelsen,
Glass Cutter.

Nº 56,231.    Patented July 10, 1866.

Witnesses:    Inventor:

UNITED STATES PATENT OFFICE.

J. E. KARELSEN, OF NEW YORK, N. Y.

DIAMOND-HOLDER.

Specification forming part of Letters Patent No. 56,231, dated July 10, 1866.

*To all whom it may concern:*

Be it known that I, J. E. KARELSEN, of the city, county, and State of New York, have invented a new and Improved Diamond-Holder; and I do hereby declare that the following is a full, clear, and exact description thereof, which will enable others skilled in the art to make and use the same, reference being had to the accompanying drawings, forming part of this specification, in which—

Figure 1:
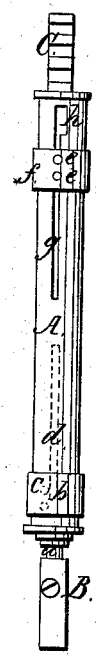
Figure 2:

Figure 1 represents a front elevation of this invention. Fig. 2 is a transverse section of the same.

Similar letters of reference indicate like parts.

This invention consists in a tubular holder which is provided with two sleeves, one of which is connected to the head, into which a diamond is inserted, while the other connects with a notched tool intended to break off the glass, in combination with guide-slots and lateral notches, in such a manner that both the diamond-head and the glass-breaker can be drawn in or pushed out, and that the same, when they are pushed out by slightly turning the sleeve, are rendered rigid and prevented from receding spontaneously.

A represents a tubular holder, made of sheet metal or any other suitable material, and ornamented by heads or collars at both ends, or in any other desirable manner. This tubular holder is large enough to admit at one end the diamond-head B, and at the other the glass-breaker C.

The diamond-head is attached to a shank, $a$, which is fastened to a sleeve, $b$, by means of rivets $c$, which pass through a slot, $d$, in the holder A, and the glass-breaker is connected to a sleeve, $f$, by means of rivets $e$, which pass through a slot, $g$, in the holder A.

The outer ends of the slots $d$ $g$ are provided with lateral notches $h$, so that when the sleeves are moved down to the ends of the holder and slightly turned the rivets $c$ and $e$ will catch in said notches, and thereby the sleeves are prevented from receding spontaneously.

By sliding the sleeves out the diamond-head and the glass-breaker are brought in working position, and when the sleeves are turned into the notches $h$ said tools can be used without danger that they will move back and cause an injury to the glass to be operated upon.

When the tools are not used they are moved back into the tubular holder, and said holder can be conveniently carried in the pocket.

What I claim as new, and desire to secure by Letters Patent, is—

A diamond-holder composed of a tube, A, provided with two sleeves, $b$ $f$, moving in notched slots $d$ $g$, and containing the head B and the glass-breaker C, as a new article of manufacture.

J. E. KARELSEN.

Witnesses:
WM. F. MCNAMARA,
ALEX. F. ROBERTS.